United States Patent [19]

Solomon

[11] 4,021,671

[45] May 3, 1977

[54] IONIZATION DETECTOR

[75] Inventor: Elias E. Solomon, Duxbury, Mass.

[73] Assignee: Gulf & Western Manufacturing Company (Systems), New York, N.Y.

[22] Filed: July 7, 1975

[21] Appl. No.: 593,704

[52] U.S. Cl. .................................................. 250/381

[51] Int. Cl.[2] .......................................... G01N 23/12

[58] Field of Search ........... 250/381, 384, 385, 389

[56] References Cited

UNITED STATES PATENTS

| | | | |
|---|---|---|---|
| 3,514,603 | 5/1970 | Klein | 250/385 |
| 3,560,737 | 2/1971 | Skildum | 250/385 X |
| 3,728,706 | 4/1973 | Tipton et al. | 250/381 X |
| 3,866,195 | 2/1975 | Ried, Jr. | 250/381 X |

*Primary Examiner*—Davis L. Willis
*Attorney, Agent, or Firm*—Wolf, Greenfield & Sacks

[57] ABSTRACT

An ionization detecting fire alarm device that comprises a double chamber structure, a source disposed in at least one of the chambers and a vernier adjusting screw electrode protruding into one chamber. The chamber containing the adjustable electrode is more open to the atmosphere than the other chamber, porting is provided between chambers and detection occurs by sensing the rate of change of ionization current in the chamber structure. The source or sources, one being in each chamber, is a beta source such as a nickel 63 source. A change in ionization current is detected by a unique circuit of this invention which comprises a programmable unijunction transistor oscillator circuit.

19 Claims, 4 Drawing Figures

IONIZATION DETECTOR

BACKGROUND OF THE INVENTION

The present invention relates, in general, to ionization detectors and is more particularly concerned with a device for detecting fires which employs a beta source.

There are numerous different types of ionization fire alarm devices which are known. These detectors typically comprise one or two chambers and one or two radio-active sources. These devices operate on the basic principle of a change in the ionization current within the chamber upon detection of products of combustion and aerosols in the atmosphere where the detector is located.

Most of these detectors, including virtually all commercial detectors, employ an alpha source such as Americium 241. While these sensors have gained acceptance and are widely used in fire detection systems, it is well known that alpha particles are very much more hazardous than beta particles. It has been argued that normally the radiation is trapped within the ionization chamber and thus there is no problem. However, there are circumstances which have occured wherein a detector using alpha particles has become hazardous. For example, situations have arisen after a fire where detectors have been lost in the rubble thus making disposal of the rubble a problem.

Accordingly, to make a safer device, it would be desirable to construct a detector using a low activity beta radiation source. Even some of the prior art patents such as U.S. Pat. Nos. 3,573,777; 3,271,756; 3,295,121; and 3,560,737 have mentioned the beta source as a possible radiation source for ionization detectors. However, generally speaking there is no detector currently available that uses a beta radiation source. There are many factors that may account for this lack of a use of the beta source. Generally, beta sources which have been considered were of the high activity type and thus were not suitable for constructing compact detectors. Other beta sources, such as Tritium, have a short half-life and present mechanical problems, such as migration. Therefore, these detectors were not suitable for use in ionization detection. In accordance with this invention preferably a low activity beta source is used such as nickel 63.

A further problem in the prior art with the use of beta sources is the extremely low ionization current that is available with these detectors. This usually results in difficulties with the associated electronic circuitry as well as producing problems regarding detection of extraneous noise signals. In accordance with this invention, the design of the chamber structure and the choice of the circuitry greatly reduce the problem of the low ionization current.

Still another problem associated with known ionization detectors is that, because the detectors may be used in different environments, it is difficult to produce a detector that will operate suitably in all of these environments without requiring adjustment in the field. In the past, many of these detectors were subject to humidity changes and air density changes which affected the sensitivity of the detector. Also, another problem with known detectors using radio-active sources is the tolerance of the source itself. While dimensions within the chamber can be held to a very close tolerance, radiation activity differs from source to source.

For example, U.S. Pat. Nos. 3,295,121 and 3,271,756 reveal a means for adjusting voltages at the ionization chamber output. However, these means rely on the alteration of the chamber geometry or the adjustment of distance electrodes. This is a complex mechanical adjustment and will not give the degree of control as that provided by the adjustment means of the present invention. With the adjustable electrode of the present invention, detectors may be constructed with wide variations in sources from one detector to another.

Accordingly, it is one object of the present invention to provide a safe and reliable apparatus for detecting products of combustion and aerosols in a gas or typically the atmosphere.

A further object of the present invention is to provide a detector which is easy to produce and easy to adjust for optimum performance.

Another object of the present invention is to provide an improved ionization detector comprising a double chamber structure with one of the chambers being the basic sensing chamber with porting being provided between the chambers to compensate for slow ambient changes. The sensing chamber is preferably ported to both the secondary chamber and the atmosphere outside of the chamber structure.

Still a further object of the present invention is to provide a simple means of adjusting the voltages available from the ionization chamber. In accordance with this invention there is provided an additional adjustable electrode within the ionization chamber. Actually, one adjustable electrode can be used in each chamber if it is a two chamber structure.

Another object of the present invention is to provide an ionization chamber structure that comprises baffles for directing the air to be sensed and that further comprises an electrostatic screen for the ionization chamber or chambers.

Still another object of the present invention is to provide a unique electronic circuit which will provide an inexpensive and reliable means for detecting the signal change which occurs in the ionization chamber.

A further object of the present invention is to provide a means for adjusting the decision level of the alarm circuit of this invention to allow for any desired sensitivity setting.

Still a further object of the present invention is to provide means associated with the circuitry for providing a visual indication of the condition of the ionization chamber structure.

SUMMARY OF THE INVENTION

To accomplish the foregoing and other objects of this invention, the ionization detector generally comprises a chamber structure including means defining first and second chambers having respective first and second preferably plate-like electrodes and a common electrode separating the first and second chambers. Communication is provided between these chambers preferably by a porting arrangement and each of the chambers also has preferably a porting arrangement for communicating to the ambient atmosphere. One or both of the chambers may have a source preferably of beta particles contained therein. The detector also comprises an adjustable electrode contained in one of the chambers for adjusting the voltage between the fixed electrode of that chamber and the common electrode between the chambers. The electrodes of the chamber structure are coupled to detection circuitry for detecting a change in the ionization current when a fire alarm condition exists.

In accordance with another aspect of the present invention, there is provided a unique detection circuit which comprises a relaxation oscillator circuit including a programable unijunction transistor and light emitting diode. The circuitry also comprises a second programable unijunction transistor circuit having delay means associated therewith for providing the basic alarm detection. The first oscillator circuit including the light emitting diode is primarily for detecting proper operation of the chamber structure.

BRIEF DESCRIPTION OF THE DRAWINGS

Numerous other objects, features and advantages of the invention will now become apparent upon a reading of the following detailed description taken in conjunction with the accompanying drawings, in which.

DETAILED DESCRIPTION

The chamber structure of the present invention is constructed in two separate sections and is preferably provided having three separated fixed electrodes or plates. In addition to the fixed electrodes, one of the chambers also has extending thereinto an adjustable electrode which may be in the form of a vernier adjusting screw or an adjusting plate.

Figure 1:
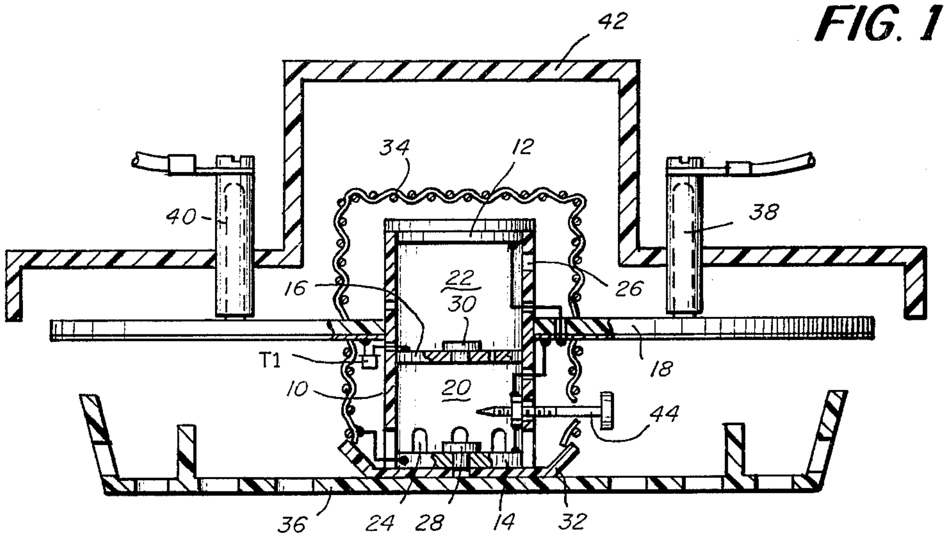
FIG. 1 is a cross-sectional view through one embodiment of the detector of this invention.

FIG. 1 shows one embodiment for the chamber structure which comprises an insulated cylinder 10, a top conductive plate 12, a bottom conductive plate 14, and an intermediate conductive plate 16. The cylinder 10 is suitably supported in a printed circuit board 18 having an opening therethrough of appropriate size to receive the cylinder 10. The printed circuit board 18 has terminals for receiving connections from the chamber structure. The plates and cylinder define a bottom chamber 20 and a top chamber 22. The cylinder at its bottom end has a plurality of slots 24 so that the chamber 20 is virtually open to the outside environment allowing for free movement of air through the chamber 20. The chamber 22, on the other hand, contains one or more orifices 26 which permits any slow changes in the outside environment to be communicated to chamber 22. Passages also exist in plate 16 so that any changes in the environment in chamber 20 are commutated to chamber 22. In this way slow variations are not detected by the chamber structure of this invention.

Preferably, there is no source 28 in chamber 20 and one source 30 in chamber 22. Alternatively, if only one source is used, preferably source 28, which is disposed in chamber 20, is used. Preferably, the source is used in the chamber that also contains the adjustable electrode.

The chamber structure may be supported by an insulated base 32 having a mesh screen or shield 34 supported therefrom about the cylinder 10. This shielding prevents r.f. and static pickup. In the embodiment shown in FIG. 1, it is noted that the plate or electrode 14 is conductively coupled to the shield 34.

FIG. 1 also shows the baffle 36 which is suitably secured to support base 32. This baffle 36 directs the air stream and yet limits the air stream passing to the detector. The detector is supported by means of support posts 38 and 40 both of which may be hollow. These supports posts support the printed circuit board 18 at opposite ends from a main support frame 42. The posts 38 and 40 may have wires running therethrough so that connections can be provided from the chamber structure to the circuitry discussed later in FIG. 6.

As previously mentioned, one problem with detectors that use radio-active sources is the tolerance of the source. While the dimensions within the chamber can be held to a very close tolerance, radiation activity differs characteristically from source to source. In accordance with this invention adjusting means are provided to enable the detectors to be constructed with a wide variation in the source that is employed. To achieve this an extra adjustable electrode 44 is employed. This electrode has a screw thread that is received by a threaded nut suitably supported in the wall defining the cylinder 10. The electrode may be electrically connected to any of the collector plates 12, 14 or 16 or may even be connected to a separate reference voltage. In the preferred embodiment, the electrode 44 is connected to either plate 12 or plate 14. In FIG. 1 it is noted that the electrode couples to plate 14 and is also shown being conductively tied to a point on the printed circuit board 18.

The electrode 44 extends into the ionization chamber 20 a predetermined distance. In this way the electrodes are captured by this adjustable electrode and the voltage between the plates 14 and 16 is consequently increased. As previously mentioned the electrode can simply be an adjusting screw which is adjusted to protrude into the chamber to varying depths. The further that the electrodes protrudes into the chamber the more electrons are captured and the voltage between the plates 14 and 16 is increased. With this adjustable electrode it is thus possible to vernier-adjust the voltage level between the plates 14 and 16 to an optimum level which is preferably about one half the supply voltage.

Figure 2:
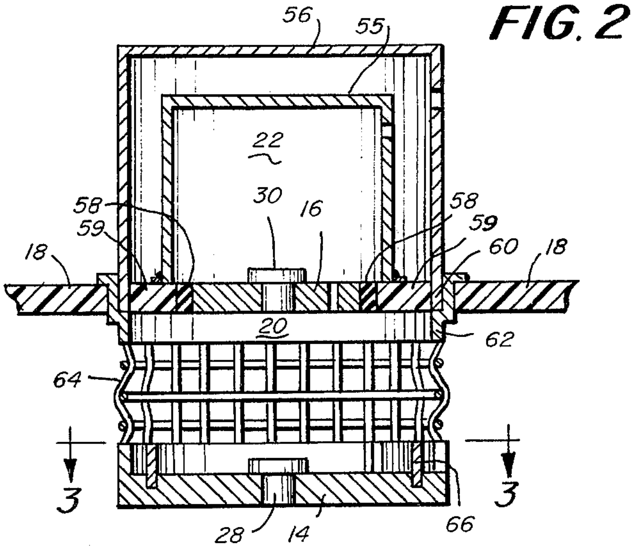
FIG. 2 is a cross-sectional view through a different embodiment of the detector.
Figure 3:
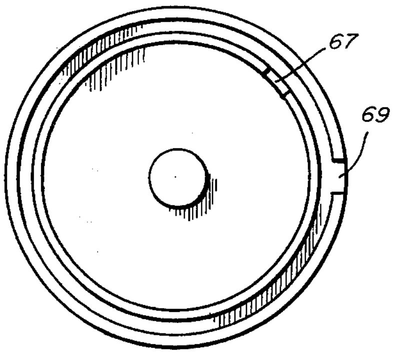
FIG. 3 is a cross-sectional view taken along line 3—3 of FIG. 2.
Figure 4:
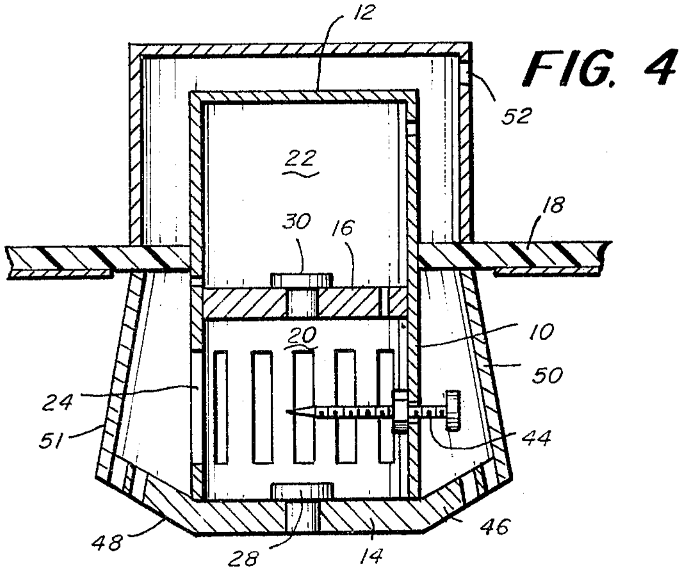
FIG. 4 is still a further cross-sectional view of a slightly different embodiment of the invention.

In FIGS. 2–6, reference characters are used like those shown in FIG. 1 to identify like parts. Thus, for example, FIG. 4 shows the printed circuit board 18, insulating cylinder 10, plates 12, 14 and 16, and chambers 20 and 22. Chamber 20 has a series of elongated slots 24. In this embodiment there are two sources 28 and 30 disposed respectively in chambers 20 and 22. The adjusting electrode 44 is like that shown in FIG. 1 and the basic chamber structure is also like the chamber structure shown in FIG. 1. However, in FIG. 4 the bottom plate 14 terminates in deflector ends 46 and 48 each having perforations therein. The stucture shown in FIG. 4 and in the other drawings is basically of cylindrical shape as is the outer collar 50. The collar 50 also has one or more apertures 52 for causing an equilization in any slow changes between the outside environment and the environment inside of the collar 50. The deflector ends are essentially arranged concentrically around the chamber. The arrangement including the downwardly extending wall 51 of the collar 50 prevents direct horizontal or vertical air movement into the chamber 20.

FIGS. 2 and 3 show still another embodiment of the present invention. This embodiment is supported by the printed circuit board 18 and comprises base plate 14 and associated source 28; intermediate plate 16 and associated source 30 and caps 55 and 56. The plate 16 has at least one port passing therethrough for communication between the chambers 20 and 22. Insulating ring 58 separates the plate 16 from the printed circuit board section 59.

A ring 62 extends below the board 18 and supports a wire mesh 64 between the ring 62 and the support base 14. An annular sliding ring 66 fits within the base 14 and has an aperture 67 which may be aligned with the aperture 69 (see FIG. 3) to permit access inside of the chamber 20 for cleaning or replacing the source 28 contained therein.

The caps 55 may be constructed of a solid metal or a metal mesh. The cap is received to the section 59 of the printed circuit board by soldering. Cap 56 is preferably a metal mesh having three bottom tabs 60 fitting into holes in the printed circuit board 18. The ring 62 mates with the tabs 60, as shown, to electrically connect the cap 56 and ring 62 (also mesh 64). The top of ring 62 extending above board 18 is soldered to board 18.

In the embodiment shown in FIGS. 2 and 3 there is not disclosed any adjustable electrode. However, this electrode could simply be supported for insertion into the chamber 20 through the mesh 64.

Figure 5:
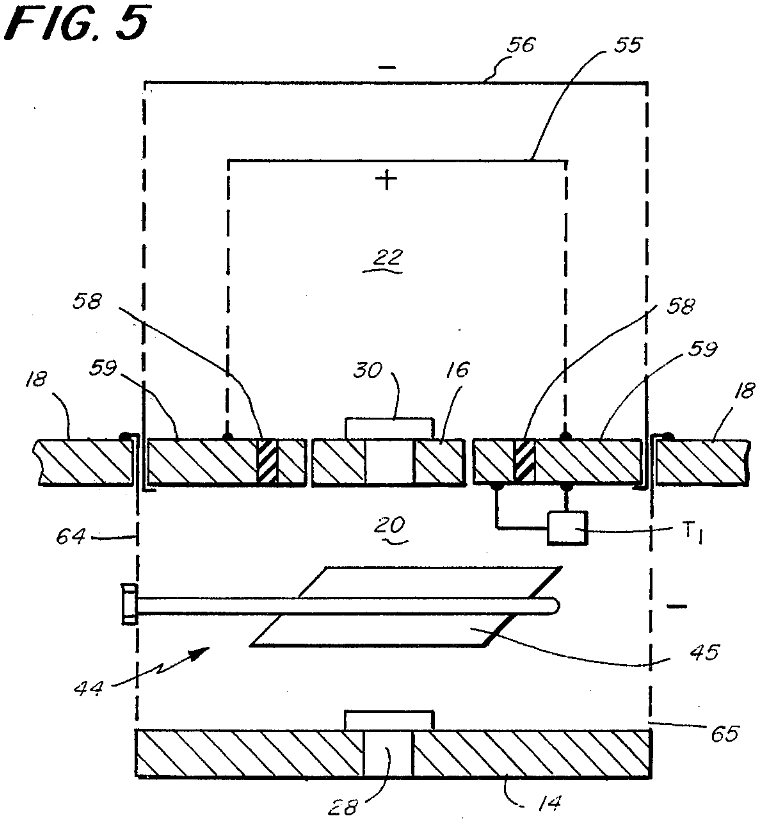
FIG. 5 is a somewhat schematic cross-sectional diagram of another embodiment employing a different adjustable electrode.

Referring now to FIG. 5, there is shown a partial cross-sectional and schematic diagram disclosing a structure quite similar to that shown in FIGS. 2 and 3. In this arrangement there is provided a lower mesh 64 that is open and provides quite free access into the chamber 20. Mesh 64 connects at its top end at a number of points to cap 56 as shown in FIG. 5. The board 18 has a like number of passages for receiving the tab of cap 56 and top end of mesh 64. The caps 55 and 56 are constructed of a mesh that is quite closed with quite small apertures, as schematically depicted in FIG. 5. A port 65 is provided above the plate 14 so that there is access to the source 28 for cleaning this source. The source 30 may be cleaned by removing the caps 55 and 56.

The embodiment of FIG. 5 differs from that shown in FIGS. 2 and 3 primarily because of the adjusting screw 44 which has a vane 45 disposed along its length. As the screw is rotated, the surface area presented to the ionization path varies thus altering the current within the chamber. With this structure the adjusting screw can provide an adequate range of adjustment through one revolution of the screw or less.

Figure 6:
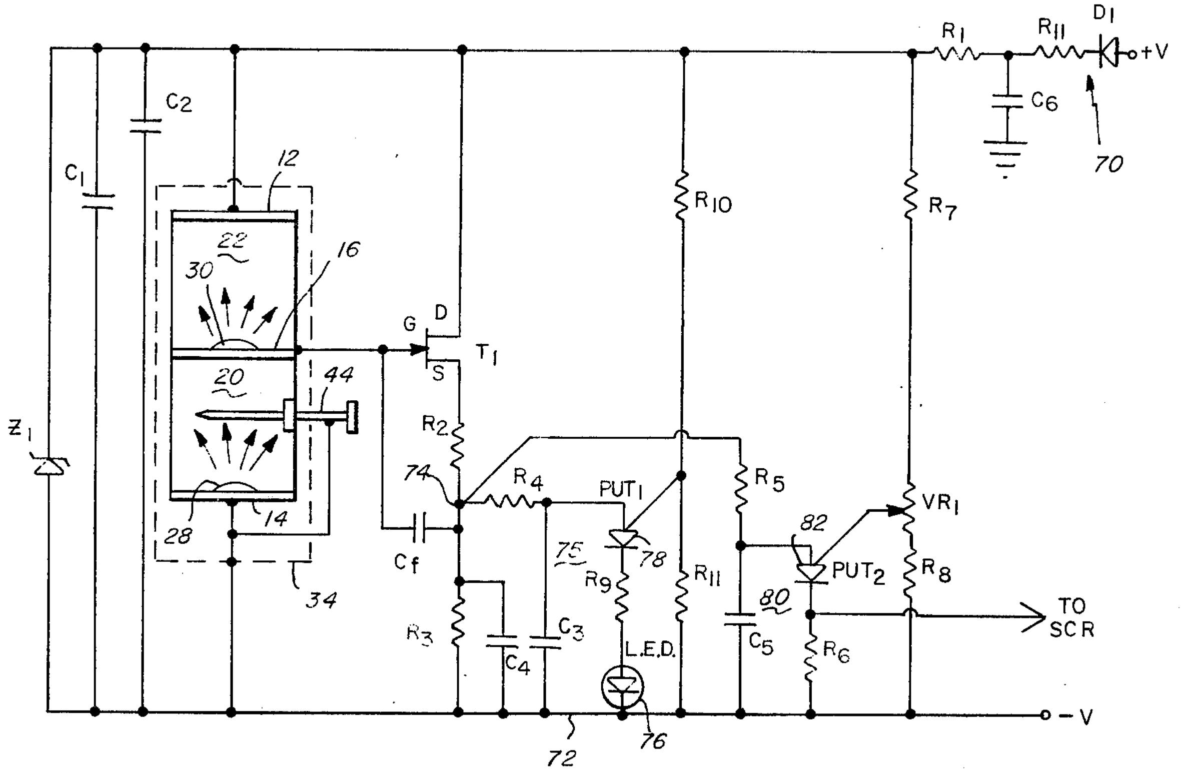
FIG. 6 is a circuit diagram associated with the detector of this invention.

FIG. 6 shows a preferred circuit for connection to the ionization chamber for generating an alarm condition upon detection of smoke. The detection chamber shown in FIG. 6 may be of the type disclosed and previously discussed with reference to FIG. 1. In this construction, there are provided the two chambers 20 and 22 each respectively housing beta sources 28 and 30. The plate 12 couples by way of protection circuit 70 to the positive voltage supply and plate 14 along with adjusting screw 44 couples to the negative voltage supply. The adjusting screw 44 is preferably adjusted so that the voltage at plate 16 is at the desired optimum level which is typically one half the positive supply voltage.

The protection circuit 70 comprises diode D1, resistor R1 and R11, and capacitor C6. This circuit provides line conducted r.f. interference protection. The basic voltage maintained across the detection chamber is established by the Zener diode Z1. This diode or a like voltage regulator may be used to insure a stable voltage supply for the ionization chamber and the associated circuitry. Capacitor C1 is preferably of a relatively large value such as 10 microfarad and capacitor C2 is preferably of a relatively low value such as 0.01 microfarad. These two parallel arranged capacitors provide transient and r.f. protection to the chambers and the associated circuitry.

Transistor T1 is a field effect transistor having its gate electrode coupled from the plate 16 of the detection chamber. The drain electrode of the transistor couples to the positive supply line and the source electrode of the transistor couples by way of resistors R2 and R3 to the minus voltage line 72. The transistor T1 is preferably contained within the shield as clearly indicated in FIG. 1. This transistor is a source follower which converts the extremely high impedance at its input gate electrode to a more manageable value at the source electrode of the transistor R2 and R3 form the load for the field effect transistor. Capacitor Cf is a relatively low value bootstrap capacitor connected between the node of resistors R2 and R3 and the gate electrode of the transistor. The purpose of this capacitor is to minimize the influence of r.f. radiation and transient signals that may occur at the node of resistors R2 and R3. The voltage at the node 74 is coupled to two separate but like circuits one of which is relaxation oscillator 75. This oscillator comprises resistors R4, R9, R10, and R11, capacitor C3, light emitting diode (LED) 76, and programmable unijunction transistor 78. The reference voltage for the oscillator 75 is established by resistors R10 and R11. The node between these resistors couples to the gate electrode of the transistor 78. The values of resistor R4 and capacitor C3 are chosen so that there is a relatively long pulse rate of, for example, one pulse ever 5 seconds for illuminating LED 76. The purpose of the oscillator 75 is to supervise the voltage at the source of transistor T1 and thereby supervise the condition of the ionization chamber. The resistor R10 and R11 are preselected so that the voltage at the node therebetween is lower than the source voltage of transistor T1 if the chamber is functioning properly. Under these conditions the oscillator 75 is operating and the LED 76 produces a periodic light pulse to indicate the operative condition of the chamber. The resistors R10 and R11 may be adjusted so that the voltage at the node therebetween is, for example, +5 volts. This voltage might correspond to a source voltage at transistor T1 of, for example, +8 volts.

The node 74 also couples by way of resistor R5 to a similar type relaxation oscillator circuit 80. Circuit 80 comprises resistors R5, R6, R7, and R8, variable VR1, capacitor C5 and programmable unijunction transistor 82. The reference voltage at the gate of transistor 82 is set by means of the variable resistor. This voltage is set at a higher voltage than the voltage at the gate of transistor 78. This voltage set by variable resistor VR1 is set above the quiescent (no alarm) voltage at the node 74 by an amount dependent upon the sensitivity required. Thus, the voltage at the node 74 must rise by a predetermined amount before there is an output from the cathode electrode of transistor 82. The output from the transistor 82 may be connected directly to an alarm system or via a gating circuit to provide isolation from other sensors. Alternatively, this output can be connected to a suitable device such as an SCR or relay.

The resistor R5 and capacitor C5 are chosen to give the proper delay which may be on the order of five seconds. This delay insures insensitivity to transient conditions but occur in the circuitry or that are induced extraneously.

Many existing circuits employ comparators for detection or voltage variations at the ionizaton chamber. However, in accordance with this invention it has been found that the use of programmable unijunction transistors for supervising the voltage levels has distinct over comparators. For one thing, these comparator circuits are generally more expensive and the circuitry is more complex especially if a time delay and trigger circuit are to be combined with the comparator. On the other hand, a programmable unijunction transistor circuit in accordance with this invention provides a delay, voltage sensing and an adjustable trigger level while also providing excellent noise immunity. Additionally, the capacitor of the circuit is fully discharged at the end of each cycle thereby providing a known datum from which a charge cycle can be determined. This is especially useful whenever the output is connected to a pulse counting circuit for alarm purposes. Another major advantage to the circuit of this invention is that the stored charge in the capacitor C3 is used to illuminate the light emitting diode, thus removing the necessity of a relatively larger intermittent load being applied to the power supply.

When the ionization chamber detects the presence of smoke the impedance between the plates 14 and 16 increases and thus the source voltage of transistor T1 also increases. This voltage increase is coupled by way of resistor R5 from node 74 and after a delay period determined by resistor R5 and capacitor C5 the transistor 82 conducts. When this occurs, an alarm condition is generated from a signal at the cathode of transistor 82. With the chamber structure of this invention atmospheric changes over a relatively long period of time are not detected as the chamber structure provides for equalization of the environment in this condition. However, when a change in atmosphere occurs relatively rapidly as when smoke is present, this smoke enters the chamber 20 relatively rapidly and causes an almost immediate detection.

What is claimed is:

1. An ionization detector comprising;

a structure defining at least one chamber having means for receiving gases from outside of the chamber, at least a pair of fixed electrodes associated with and at least in part defining the chamber and spaced from one another, means including a radioactive source disposed in the chamber for establishing an ionization current in the chamber between the fixed electrodes, an adjustable particle capturing member contained in the chamber between the fixed electrodes and movable to alter the ionization current, means for supporting said particle capturing member independent of either fixed electrode with said member having an end extending into the chamber, the exposed area of said end within the chamber being variable to vary the number of particles captured thereby finely adjusting the ionization current, and means coupled from one of the fixed electrodes for detecting changes in the ionization current.

2. An ionization detector as set forth in claim 1 wherein said structure defines a pair of chambers and further comprising three fixed electrodes with one electrode forming a common boundary between chanbers.

3. An ionization detector as set forth in claim 2 wherein both of said chambers have means for receiving gases including at least one port.

4. An ionization detector as set forth in claim 3 wherein the access port area in one chamber is larger than in the other chamber.

5. An ionization detector as set forth in claim 4 including port means for communication directly between chambers.

6. An ionization detector as set forth in claim 5 wherein the adjustable member includes a screw protruding into the one chamber.

7. An ionization detector as set forth in claim 6 including baffle means for preventing direct gas flow to the chambers.

8. an ionization detector as set forth in claim 1 wherein the radioactive source includes a source of beta particles.

9. An ionization detector as set forth in claim 2 wherein one of said chambers is defined in part by a mesh structure and the other of said chambers is defined by a cap forming one of the fixed electrodes.

10. An ionization detector as set forth in claim 9 including access means through the one chamber for cleaning the radioactive source.

11. An ionization detector comprising;

a chamber structure including means defining a first chamber having means for receiving gases from external of the first chamber, means defining a second chamber also having means for receiving gases from external of the second chamber, and common boundary means between chambers having means for permitting the communicating of gases directly between chambers, and including a common electrode, fixed electrode means associated with each chamber and spaced from each other and also from the common electrode, means including a radioactive source disposed in at least the first chamber for establishing an ionization current in the chamber structure, an adjustable electrode contained in one of said first and second chambers for adjusting the ionization current, and means coupled from the fixed electrode means for detecting changes in the ionization current.

12. An ionization detector as set forth in claim 11 wherein the means defining a first chamber includes a relatively open mesh and the means defining a second chamber includes a less open mesh forming a cap.

13. An ionization detector as set forth in claim 12 wherein the electrode means includes a bottom plate partially forming the first chamber, an intermediate plate dividing the first and second chambers and the cap.

14. An ionization detector as set forth in claim 13 wherein the open mesh also extends over the cap.

15. An ionization detector as set forth in claim 11 wherein the adjustable electrode includes a screw protruding into the first chamber.

16. An ionization detector as set forth in claim 15 including a vane coupled to the screw of the adjustable electrode.

17. A circuit for connection to an ionization chamber to detect variations in the ionization current in the chamber comprising;

means for receiving a signal from an electrode of the chamber including an input transistor circuit having an output terminal, first supervisory circuit means including an oscillator circuit and a light source coupled from and operated from the oscillator circuit to light the light source at a set repetition rate during alarm and no alarm conditions, said oscillator circuit coupled directly from the output terminal of the input transistor circuit, and second circuit means coupled in parallel with the first supervisory circuit means including a delay circuit and a trigger circuit coupled in series directly from the output terminal of the input transistor circuit and operable to trigger the trigger circuit when an alarm condition exists, said first supervisory circuit means being responsive to a first minimum voltage level to operate the light source and said second circuit means being responsive to a second higher voltage level indicative of an alarm condition.

18. A circuit as set forth in claim 17 wherein both circuit means each include a programmable unijunction transistor.

19. A circuit as set forth in claim 17 wherein said first circuit means includes capacitance means to store charge to periodically discharge and illuminate said light source.

* * * * *